United States Patent
Neal et al.

(10) Patent No.: US 9,213,773 B2
(45) Date of Patent: *Dec. 15, 2015

(54) IMAGE BASED METHOD OF PROVIDING MEMORIAL INFORMATION

(71) Applicant: Paradise Pictures, LLC, Chico, CA (US)

(72) Inventors: Scott A. Neal, Mahtomedi, MN (US); David G. Hopper, Paradise, CA (US)

(73) Assignee: Paradise Pictures, LLC, Chico, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/527,023

(22) Filed: Oct. 29, 2014

(65) Prior Publication Data

US 2015/0058311 A1    Feb. 26, 2015

Related U.S. Application Data

(63) Continuation of application No. 13/693,317, filed on Dec. 4, 2012, now Pat. No. 8,909,670.

(60) Provisional application No. 61/568,754, filed on Dec. 9, 2011.

(51) Int. Cl.
*G06F 17/30* (2006.01)

(52) U.S. Cl.
CPC .... *G06F 17/30867* (2013.01); *G06F 17/30277* (2013.01); *Y10S 707/915* (2013.01)

(58) Field of Classification Search
CPC .......... Y10S 707/915; G06F 17/30277; G06F 17/301; G06F 17/30017; G06F 17/30058; G06F 17/30047; G06F 17/30091; G06F 17/30283; G06F 17/30864; G06F 17/30867
USPC ......... 707/769, 705, 736, 755, 758, 770, 780, 707/802, 803, 805, 915, 771; 709/217, 219
See application file for complete search history.

(56) References Cited

U.S. PATENT DOCUMENTS

| | | |
|---|---|---|
| 6,122,403 A | 9/2000 | Rhoads |
| 6,307,949 B1 | 10/2001 | Rhoads |
| 6,340,978 B1 | 1/2002 | Mindrum |
| 6,366,680 B1 | 4/2002 | Brunk et al. |
| 6,421,070 B1 | 7/2002 | Ramos et al. |
| 6,516,079 B1 | 2/2003 | Rhoads et al. |
| 6,993,573 B2 * | 1/2006 | Hunter .......................... 709/218 |
| 7,222,120 B1 | 5/2007 | Mindrum |
| 7,254,666 B2 | 8/2007 | Toothman, III et al. |

(Continued)

OTHER PUBLICATIONS

Sarah, Dewey, "Death Goes Digital: Washington's Memorial Manufacturers Reimagine the Headstone", Seattle Business, http://seattlebusinessmag.com/article/death-goes-digital. Oct. 2011. 2 pages.

(Continued)

*Primary Examiner* — Greta Robinson
(74) *Attorney, Agent, or Firm* — Dorsey & Whitney LLP

(57) ABSTRACT

Described herein is an image-based system for retrieving information about a deceased person or animal and an image-based method of retrieving information about a deceased person or animal. The systems disclosed herein are characterized by the absence of a visible identifier indicating the availability of the information, such as a tag, bar code, and the like.

21 Claims, 5 Drawing Sheets

(56) References Cited

U.S. PATENT DOCUMENTS

| | | |
|---|---|---|
| 7,287,225 B2 | 10/2007 | Mindrum |
| 7,395,960 B1 | 7/2008 | Toothman, III et al. |
| 7,565,139 B2 | 7/2009 | Neven, Sr. et al. |
| 7,624,344 B2 | 11/2009 | Mindrum et al. |
| 7,657,835 B2 | 2/2010 | Mindrum et al. |
| 7,671,902 B2 | 3/2010 | Mindrum et al. |
| 7,920,759 B2 | 4/2011 | Hull et al. |
| 7,940,171 B2 | 5/2011 | Sahuguet |
| 7,984,380 B2 | 7/2011 | Mindrum |
| 8,909,670 B2 * | 12/2014 | Neal et al. ............. 707/770 |
| 2004/0085337 A1 * | 5/2004 | Barrows ............. 345/717 |
| 2007/0260610 A1 | 11/2007 | Mindrum |
| 2008/0005666 A1 | 1/2008 | Sefton et al. |
| 2008/0140714 A1 * | 6/2008 | Rhoads et al. ............. 707/104.1 |
| 2008/0195720 A1 | 8/2008 | Toothman et al. |
| 2008/0281831 A1 | 11/2008 | Mindrum |
| 2008/0282163 A1 | 11/2008 | Mindrum |
| 2008/0316542 A1 | 12/2008 | Mindrum et al. |
| 2010/0113069 A1 | 5/2010 | Mindrum et al. |
| 2012/0307277 A1 | 12/2012 | Kishida |
| 2013/0315445 A1 | 11/2013 | Schlieski et al. |

OTHER PUBLICATIONS

ACN Staff, "Otter Creek Holdings Announces Groundbreaking Technology: Legacytec", American Consumer News, LLC. Feb. 8, 2013, 7 pages.

* cited by examiner

IMAGE BASED METHOD OF PROVIDING MEMORIAL INFORMATION

BACKGROUND

The passing away of a human being is a somber occurrence. The rituals and customs surrounding the death of a human being demand dignity and sensitivity for the sake of those who were closest to the deceased person. The burial of human remains, in a funeral ritual, is regarded in many religions as an act of tremendous importance. A funeral is a ceremony for celebrating, sanctifying, or remembering the life of a person who has died. Funerary customs comprise the complex of beliefs and practices used by a culture to remember the dead, from interment itself, to various monuments, prayers, and rituals undertaken in their honor. These customs vary widely between cultures, and between religious affiliations within cultures. Regardless of these variations, funerary customs are as old as the human culture itself.

After a person dies, it is common for people to seek information about the life of the deceased, often gathering such information to share with family members and/or those who were closest to the deceased. Living people seeking such information about a deceased person in many cases must do a substantial amount of research to gather such information, for example to make a family album, or write a biography of the person. Such information provides a source of both comfort and closure to those who were closest to the deceased. However, gathering such information is often a difficult endeavor because families, friends, coworkers, and others have different information about the deceased person and public records are not often sources of complete or cohesive collections of information in the case of most individuals. Further, if a first person gathers a substantial amount of information about a deceased person, it is not always apparent to a second person seeking essentially the same information that it has been gathered, in part or in whole, by the first person.

If a substantial amount of information regarding a deceased person were easily available and accessible by family members and potentially other interested parties, the information would potentially be widely accessed. If individuals have to hunt down information and notify family members that, for example, a family album of memories regarding a deceased family member is available, the information would be less widely known and accessed. Therefore, it is desirable for such information to be directly ascertainable by those seeking it from a single, widely accessible source. The advent of the World Wide Web has enabled such direct access to information. Online web pages are used as a repository for categorized and easily accessible information. Many people set up and maintain web pages that serve as memorials to deceased family members and loved ones; alternatively, registries have been generated wherein a family member or loved one can reserve a "page" for such a digital memorial; for example, FACEBOOK® (Facebook Inc. of Palo Alto, Calif., at www.facebook.com) can be used for this purpose. Digitized pictures, stories provided by family and friends, memorials, biographical information, video recordings, audio recordings, and the like are easily uploaded and accessed by others. The content of such online registries can, if desired, be restricted to those provided with a user name and password (or an established identity, in the case of social media such as FACEBOOK®) to gain entry to the website or to certain content within the website. This provides a tailorable level of access to a family's private information about a deceased.

Additional means to access and provide such digital memorial information in a "package" have been set forth, wherein a person visiting a cemetery can gain direct access to memorial information about a deceased person buried within. For example, Toothman, U.S. Pat. No. 7,395,960 teaches a system for providing memorial information about a deceased party at a cemetery location. The system includes a memory device affixed to an object at the cemetery—such as a tombstone—and including on-board memory in the form of e.g. a random access memory. A person with a handheld device can access the on-board memory to retrieve the information from the memory device. Where the memory device includes e.g. random access memory, the information thereon can be modified, updated, and so forth. Similarly, Mindrum, U.S. Pat. No. 7,222,120 describes a registry system for deceased persons, including a computer, a concrete memorial, an online registry service containing information about the deceased person, and a "good" or a "tag", e.g. a bar code. The tag is affixed to the concrete memorial or a location nearby, wherein the identifier notifies visitors that information related to the deceased person is available in the online registry service. Then a handheld device such as a cell phone can be used to interpret the identifier and retrieve memorial information about the deceased person buried nearby.

Recently, the memorialization industry has begun to adopt such technology by attaching quick response codes, or "QR codes" directly to tombstones and the like within cemetery locations. QR codes are two-dimensional bar codes that contain information allowing a person with a smartphone to scan the code and provide a link to online information about the deceased. QR codes are widely adopted elsewhere to provide links, in similar fashion, to advertisements, social media pages, and so forth.

Devices such as QR codes, memory devices, and the like, while useful for achieving the purpose of providing an on-site link for cemetery visitors to information about a deceased person, detract from the dignity and aesthetics of a burial site. Many people are unwilling to affix on the gravesite of a loved one what appears to be a link to an advertisement or to social media. Thus, there remains a substantial need to provide access to digital memorial information in a format wherein a person visiting a cemetery can gain direct access to memorial information about deceased persons buried within, without having a separate or unique device attached to a tombstone or near the physical grave location.

SUMMARY

We have found that digital recognition of the image of a memorial or a distinctive feature thereon is useful as a means to identify and provide access to digital information about the deceased person that is memorialized. Accordingly, disclosed herein is an image-based system for retrieving information about a deceased person or animal.

One embodiment of the invention is a method of obtaining information about a deceased person or animal, wherein the method includes a. obtaining input information from a mobile device, the mobile device including a digital camera, wherein the input information comprises sample values obtained from a digital camera image of the memorial information, the memorial information including a memorial portrait, b. providing the input information to a database via a communication link, the database located on a server, c. receiving output information on the mobile device from the database via the communication link, wherein the output information is associated with a deceased person or animal; and d. displaying the output information on a mobile device.

Another embodiment of the invention is a system for retrieving information about a deceased person or animal, wherein the system includes
- a. memorial information including a memorial portrait,
- b. a server having a database, the database including output information related to a deceased person or animal; and
- c. a mobile device including a digital camera, an operable communications link with the server, and a screen for displaying the output information, wherein the mobile device, the server, or both include one or more recognition algorithms; and wherein the memorial information is characterized by the absence of a memory device, tag, good, bar code, or other identifier visible to the human eye that indicates the availability of the output information.

Yet another embodiment of the invention is method of obtaining information about a deceased person or animal, the method including provider actions and end user actions, wherein the provider actions include:
- a. obtaining a digital image of the person or animal,
- b. creating a memorial portrait from the digital image,
- c. generating input information by
  - i. recording sample values representing the digital image or the memorial portrait; and
  - ii. associating the sample values with a selected set of output information in a database, the database residing on a server, wherein the output information is associated with a deceased person or animal; and
- d. providing an end-use application to a mobile device, the end-use application operably engaged by the end user to at least establish a communication link with the server;

and wherein the end-user actions include:
- e. obtaining input information from the mobile device, the mobile device including a digital camera, wherein the input information includes sample values obtained from a digital camera image of the memorial information, the memorial information including a memorial portrait,
- f. providing the input information to a database via a communication link, the database located on a server,
- g. receiving output information on the mobile device from the database via the communication link; and
- h. displaying the output information on the mobile device.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Figure 1:
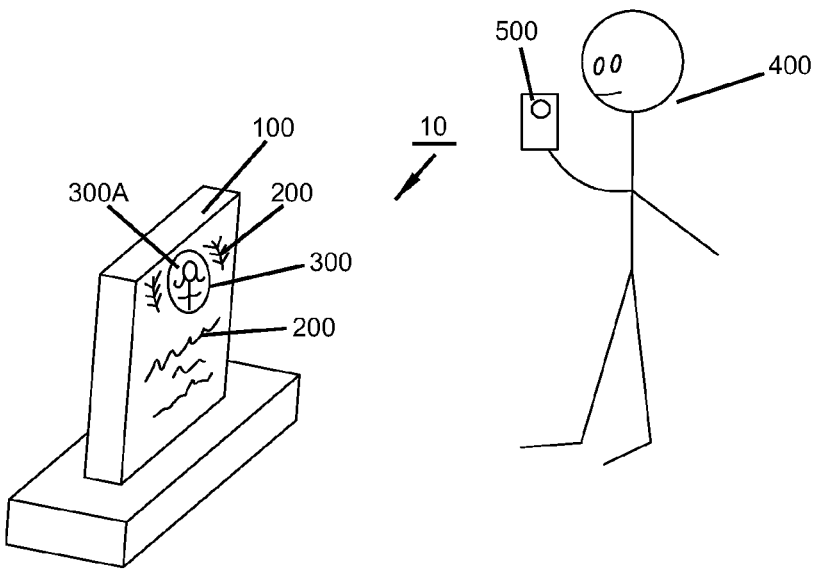
FIG. 1 is a schematic representation of a method of the invention.
Figure 2A:
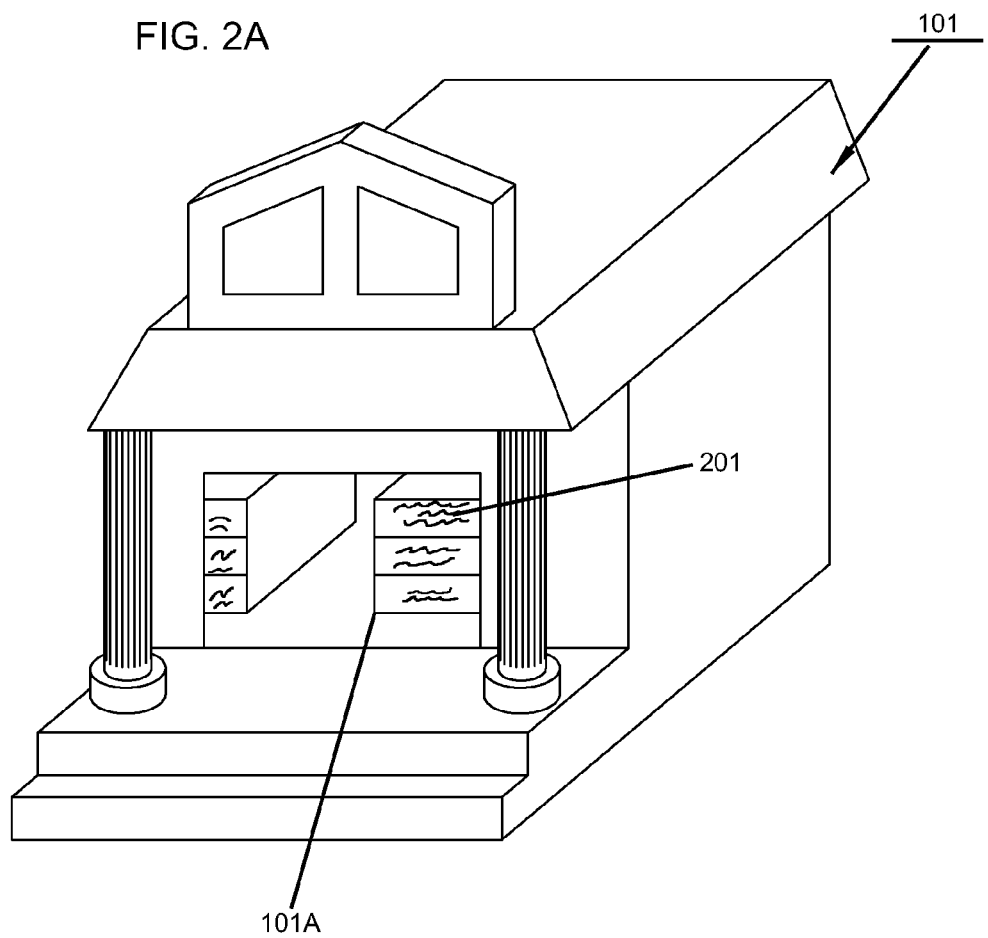
FIG. 2A-2D are schematic representations of memorials that are recognized in the method of the invention and associated memorial information.
Figure 2B:
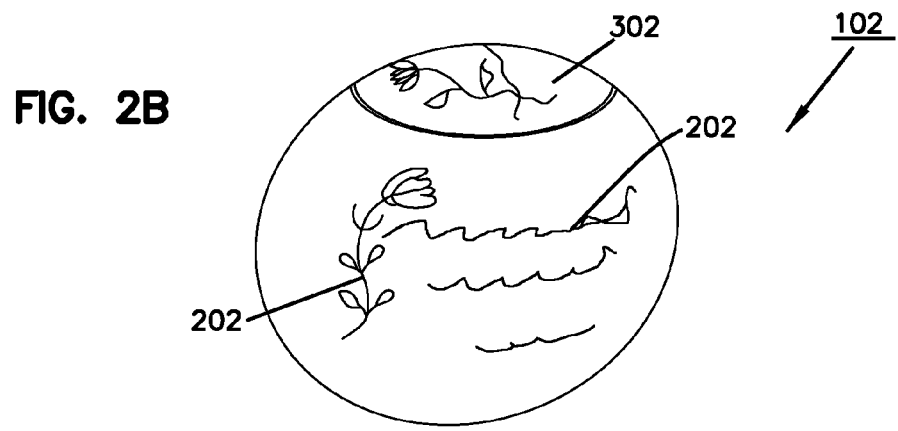
Figure 2C:
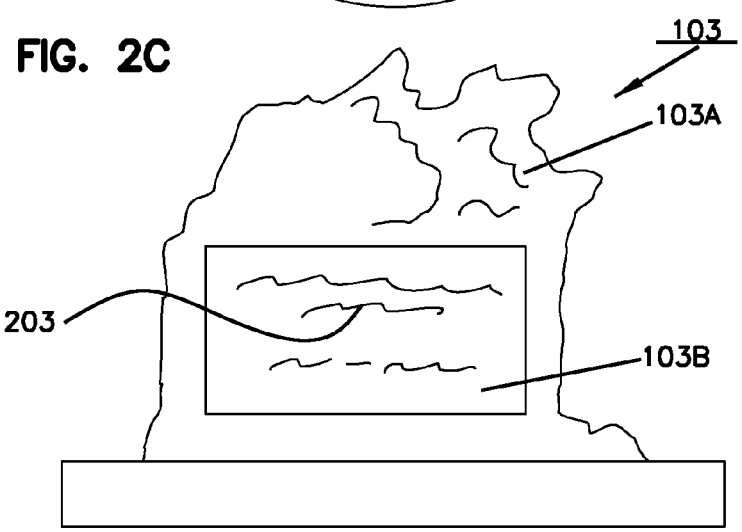
Figure 2D:
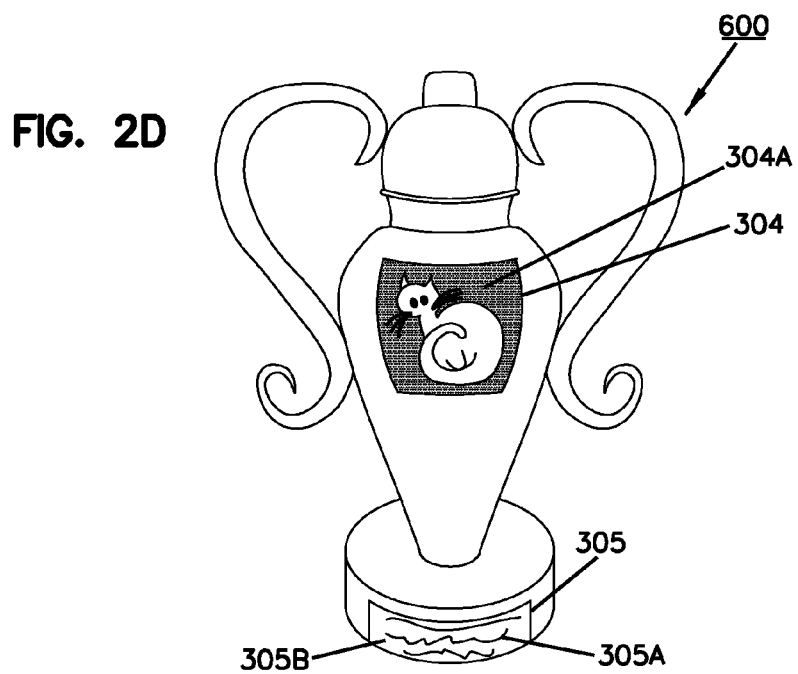

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

As used herein, the term "person" can be singular or plural. Where a person to be memorialized is discussed, such memorialization can also apply to an animal.

As used herein, the term "memorial business" is any commercial or nonprofit organization related to the care and handling of deceased persons or animals, the memories of deceased persons or animals, memorials dedicated to deceased persons or animals, or a combination of one or more thereof. Memorial businesses include, but are not limited to, undertakers or funeral directors, funeral homes, cremation service providers, veterinarian offices or other businesses associated with burial or cremation of pets, headstone engraving businesses, memorial portrait manufacturers such as manufacturers of ceramic or porcelain portraits for headstones, mausoleums, cenotaphs, or urns database maintenance services dedicated to deceased persons or animals, and the like.

As used herein, the term "customer" means either a person or a business entity such as a memorial business, depending on context. In some embodiments, a customer is an intermediary between a service provider and the end user, wherein the end user is the ultimate requestor, or benefactor, of the image-based information retrieval system for memorials. In some embodiments a customer is an end user. In some embodiments, there are both intermediary customers and end user customers.

As used herein, the term "memorial" means a physical and tangible notification containing identifying information about a deceased person. For example, in embodiments, the memorial is a grave marker. Examples of grave markers include a headstone (gravestone, tombstone), a marked section of a mausoleum, or other physical notification that the remains of a deceased person identified by memorial information on the memorial reside nearby. A headstone is, in many embodiments, a stone marker made with cement, bronze, marble, or granite; however, other materials are also employed in making a headstone. Where the remains of the deceased are buried in a geographic location remote from the memorial, the memorial is referred to as a cenotaph. Where the remains of the deceased have been cremated, the remains are in some embodiments contained in an urn or some other suitable container, wherein the container itself is the memorial and is marked thereon with identifying information about the remains contained within. In some embodiments, the container is portable; in other embodiments it is stationary, similarly to a headstone. Because urns are often kept indoors where environmental and security considerations are not as problematic, a wider range of materials is commonly employed in the fabrication thereof; for example, glass, brass, precious metals, semiprecious or precious stones, minerals, and the like are employed in some embodiments as memorials or parts thereof.

As used herein, the term "memorial information" or "identifying information" means any unique indicia or image, or more than one indicia or image, located on or proximal to a memorial that alone or in combination identifies a deceased person. Memorial information includes indicia such as engravings or printing, and images such as porcelain or ceramic portraits, photographic portraits, or other photographic images; porcelain or ceramic renderings of digital photographs, painted works, and the like. In embodiments memorial provided on a substrate that includes ceramic, porcelain, stone, metal, or a combination of two or more thereof. Photographic images are, in some embodiments, digital images. Indicia and images also include engraved indicia or images, such as indicia or images engraved on a headstone, urn, mausoleum section, cenotaph, or statuary. An image is, in some embodiments, the image of a deceased person; however, in other embodiments, the image is of friends or family of the deceased, religious imagery, scenery, animals, or objects including trucks or cars, and the like. The type or subject of the image is not particularly limited and in many embodiments is unique to the person being memorialized. In some embodiments, an image is a portrait of the deceased person such as a ceramic or porcelain portrait. In some embodiments, an image is a digital image, or is converted from an analog image to a digital image, and the digital image is transferred onto a ceramic or porcelain substrate. In other embodiments, an image is painted by hand onto a substrate such as any of the substrates mentioned above. Memorial information also includes the shape and overall image of a uniquely shaped headstone or urn. Memorial information also includes the overall image of a headstone or urn in conjunction with indicia, images, or a combination thereof on the headstone or urn. Memorial information also includes steganographic data embedded within any of the aforementioned memorial information.

As used herein, the term "steganographic data", or "watermark", means an N-bit value embedded in a photographic image or digitized image through the addition of a very low amplitude encodation signal that is not noticeable to the human eye. Suitable techniques and apparatuses for embedding and detecting steganographic data are generally disclosed, for example, in U.S. Pat. Nos. 6,122,403; 6,307,949; 6,366,680; 6,421,070; 6,516,079 and other patents issued to the Digimarc Corp. of Tualatin, Oreg.

As used herein, the term "input information" means sample values obtained from a digital image of the memorial information that when applied to a code recognition algorithm, an optical character recognition algorithm, an image recognition algorithm, a facial recognition algorithm, or an integrated combination of two or more such algorithms results in recognition output. In embodiments, the sample values are obtained by electronic processing of the digital image of the memorial information.

As used herein, the term "recognition output" means a unique digital identifier, string, command, or the like generated by application of one or more recognition algorithms to the input information and further associated with the output information. In some embodiments the recognition output includes one or more commands. In some such embodiments, the commands include one or more of a command to send the associated output information via a communication link to a remotely located device, such as a smartphone, personal computer, tablet computer, and the like. In embodiments, the commands include a request to a web server to send information related to the string or unique identifier to the input or requesting device, or a request sent to a database intended to resolve linked data with the identifier or string such as a Uniform Resource Locator (URL), physical memory location or other processing commands. In some embodiments, to be discussed in more detail below, the recognition output is also referred to as the "identifier."

As used herein, the term "output information" means any digital information or collection of digital information including information relating uniquely to a deceased person that is stored in a database on a server and is further associated with the recognition output. Output information is available from a variety of sources and includes various forms of information. Forms of output information include written words or indicia, photographic images, audio recordings, video recordings, links to other URLs, and the like. The type or amount of output information is not particularly limited. Examples of suitable output information regarding a deceased person includes biographical information, such as dates of birth and death, full name, place of birth, schools attended, names of their children and dates of their children's birth, awards, degrees awarded, or other special recognition, various official records of events in which the deceased was included, court records, work history, military history including military honors awarded, ancestry information, and the like. Output information also includes media images or references to the deceased, such as photographs of the deceased, newspaper articles or books including information about the deceased, video or audio recordings of the deceased, and the like. Output information also includes information or records created by the deceased person, such as passages written by the deceased including autobiographies, works of art or music by the deceased, audio or video recordings created by the deceased, and the like. After the death of a person, living people may generate additional output information regarding the deceased; such output information includes obituaries, signatures in a visitor's record from a funeral proceeding or from a visit to a gravesite, testimonials, written biographies, video or audio recordings containing biographical, historical, or other memorial information, and the like. Any information deemed suitable by the deceased person as directed prior to death, or the family, acquaintances, or loved ones of the deceased, is suitably used as output information.

As used herein, the term "algorithm" means a computer programming algorithm. A group of algorithms designed to work in conjunction with one another to provide an intended end result is, in some embodiments, referred to as an "engine." For example, in some embodiments, a group of algorithms designed to receive information from a user, search the worldwide web (or internet) or a database for results, and return one or more results to the user, is referred to a "search engine" herein. In some embodiments, a group of one or more recognition algorithms that process and/or integrate input information and generate recognition output is called a "recognition engine" herein.

As used herein, the term "database" means a comprehensive collection of related data organized for convenient access, in embodiments housed within a computer or server. The data in the database includes the output information. A server houses, in some embodiments, a plurality of databases. In some embodiments, a database houses various records. In some embodiments, a server is located on the mobile device; however, in many embodiments, the server is remote to the mobile device.

As used herein, the term "record" means a related collection of information that resides within a table that in turn resides within a database. A table contains rows and columns. Each row is a record, and each column, is a field. A record is a meaningful and consistent way to combine information about something. As used herein, the term "field" means a single item of information such as an item type that may appear in every record. For example, in the output information table within a database each record can hold information about one person. Each field can hold some type of information about that person, such as their name, death date, photograph or other relevant data.

Embodiments

The invention is an image-based information retrieval system for memorials. In embodiments, the image-based memorial information retrieval system is employed in conjunction with one or more memorial businesses. The image-based memorial information retrieval system includes memorial information, a mobile device having a digital camera and an electronic processor, and a remote server. In embodiments, the mobile device is a cellular telephone; in some embodiments, the cellular telephone is a smartphone with a built-in camera and, in some embodiments, an established wireless communication link for transmitting an image from the built-in camera to a remote server. In other embodiments, a communication link to the remote server is established by a user that engages an end-use application, or "app," that resides on the mobile device. In other embodiments, the communication link for transmitting an image to the remote server is accomplished by physically connecting the mobile device to a computer, transferring an image to the computer, and transmitting the image to the remote server via an internet connection. In still other embodiments, the image is transmitted to the server by physically connecting the mobile device to the server computer, and transferring the image to the server computer. In still other embodiments, the device processes an image and the resulting processed image information—or recognition output—is transferred to a search engine that searches through a database. The wireless communication link is, in some embodiments, a wireless internet connection, cellular data connection, or a satellite service connection.

The server, the mobile device, or both include a recognition engine. The recognition engine includes at least one recognition algorithm selected from an optical character recognition algorithm for generating a first confidence value based on an image from the mobile device, an object recognition algorithm for generating a second confidence value based on an image from the mobile device, a face recognition algorithm for generating a third confidence value based on an image from the mobile device, and an integrator module for receiving one or more confidence values and generating a recognition output. Alternatively, the server or the mobile device includes a code recognition algorithm for generating a confidence value based on a steganographic image embedded within the memorial information. While in some embodiments a code recognition algorithm is combined with other recognition algorithms in a recognition engine, in other embodiments the code recognition algorithm alone is sufficient to generate a high enough confidence value that integration of recognition algorithm confidence values is not required in order to provide recognition output corresponding to one or more databases containing information associated with the correct output information. Upon receiving recognition output, a search engine searches through the database corresponding to the recognition output, and either transmits the database's appropriate output information for display on the user's mobile device, or transmits it via an email or some other means such that an end user can view the output information.

FIG. 1 shows a cemetery section 10 having a memorial 100 that is a gravestone or tombstone. The tombstone 100 has engraved indicia 200 and a ceramic portrait 300. In one embodiment, an end user 400 uses a smartphone 500 to capture a digital image of the ceramic portrait 300 wherein the digital image of 300 constitutes the memorial information; the digital image sample values are applied to a recognition engine to generate recognition output based on recognition of the ceramic portrait 300; the recognition output is sent wirelessly to a search engine; the search engine locates the appropriate record within a database on the server; and the output information in the database is sent wirelessly to smartphone 500 and displayed on the screen thereof. In another embodiment, a cemetery section 10 having a memorial 100 that is a gravestone or tombstone. In another embodiment, an end user 400 uses a smartphone 500 to capture a digital image of the area 10, tombstone 100, indicia 200, and ceramic portrait 300 wherein the digital image of 10, 100, 200, 300 combined constitute the memorial information; the digital image sample values are applied to a recognition engine to generate recognition output based on recognition of the area 10, tombstone 100, indicia 200, ceramic portrait 300, or the combination of two or more thereof; the recognition output is sent wirelessly to a search engine; the search engine locates the appropriate record within a database on the server; and the output information in the database is sent wirelessly to smartphone 500 and displayed on the screen thereof. In another embodiment, end user 400 uses a smartphone 500 to capture a digital image of tombstone 100, indicia 200, and ceramic portrait 300 wherein the digital image of the portrait 300 constitutes the memorial information; the digital image sample values are sent wirelessly to an recognition engine to generate recognition output based on the image of the portrait 300, the image of the face or other object provided on portrait 300, or the combination of both; the recognition output is applied to a search engine; the search engine locates the appropriate record within the database on the server; and the output information in the database is sent wirelessly to smartphone 500 and displayed on the screen thereof. In yet another embodiment, an end user 400 uses a smartphone 500 to capture a digital image of ceramic portrait 300, wherein portrait 300 has steganographic data 300A embedded therein; the steganographic data 300A are applied to a recognition algorithm on smartphone 500 to generate recognition output; the recognition output is sent wirelessly to a search engine; the search engine locates the appropriate record within the database on the server; and the output information in the database is sent wirelessly to smartphone 500 and displayed on the screen thereof.

FIG. 2 shows other representative examples of memorial information. FIG. 2A shows a mausoleum 101 having a section 101A having a particular individual's remains that reside therein. Section 101A bears indicia 201. The digital image of mausoleum 101, section 101A, indicia 201, or a combination of two or more thereof are the memorial information. FIG. 2B shows a spherically shaped memorial 102 having engraved indicia 202 and a ceramic picture 302. The digital image of memorial 102, indicia 202, picture 302, or a combination of two or more thereof are the memorial information. FIG. 2C shows an irregularly shaped memorial 103 having an irregular portion 103A and a carved, flat portion 103B; flat portion 103B has engraved indicia 203. The digital image of memorial 103, irregular portion 103A, flat portion 103B, indicia 203, or a combination of two or more thereof is the memorial information. FIG. 2D shows a memorial urn 600 having porcelain portrait 304 and plaque 305. Portrait 304 features an image of a deceased pet 304A; plaque 305 features printed indicia 305A and steganographic data 305B embedded therein. The digital image of urn 600, portrait 304, plaque 305, image 304A, indicia 305A, steganographic data 305B, or a combination of one or more thereof is the memorial information.

The image-based memorial information retrieval system has two parts: a provider end, and a client end. It will be understood that the processes and methods of the invention are not limited by the parties selected to carry them out. The provider end merely identifies a group of methods or actions employed to set up and administer the image-based memorial information retrieval system, while the client end identifies a group of methods or actions employed to use the image-based memorial information retrieval system to retrieve output information. In some embodiments, the provider end and the client end represent processes carried out by mutually exclusive parties, wherein a party is an individual or a group of individuals, or a business entity. In other embodiments, the provider end and the client end processes are carried out by the same parties. In some embodiments, a combination of provider end and client end processes is carried out by different parties.

In some embodiments, the provider end describes methods carried out by a memorial business. In some embodiments, some of the provider end actions are carried out by an individual that will be an end user of the image-based memorial information retrieval system. In embodiments, provider end actions include the gathering and digitization of output information, addition of output information to a database, formatting and organizing the output information on the database, maintaining and updating the database, designating and associating a selected input information and recognition output with the database, providing the one or more algorithms for code, character, image, or facial recognition, and generating and/or providing one or more end use applications, or "apps", for use by a client. In some embodiments, end use applications are generated on the provider end for download onto an end user's device such as a smartphone, tablet computer, personal computer, or a combination of two or more thereof; the end use application contains one or more algorithms to carry out, for example, a specific set of instructions, facilitate communication between the end user's device and the server via a communication link, initiate and instruct a search engine, and/or display output information. In some embodiments, the end use application also includes one or more recognition engines for code recognition, character recognition, image recognition, or facial recognition and an integrator to integrate the output of the recognition engines. In other embodiments, the one or more recognition engines, as well as an integrator where required, are provided on the server and the end use application includes commands to run the one or more recognition algorithms, the integrator, and other algorithms or to submit captured data to the server where it will be processed by one or more algorithms. The provider end may include activities by an end user such as entering and formatting the output information in a database. One such example of a provider end action is entering and formatting the output information on a FACEBOOK® page. Where an end user is particularly sophisticated, one or more additional activities that otherwise carried out by a memorial business are instead carried out by the end user.

In some embodiments, the client end describes actions carried out by the end user. In various embodiments, client end actions include downloading one or more end use applications to one or more end users' devices, generating input information by using a camera to take a digital picture of the memorial information, generating recognition output by causing the one or more recognition algorithms to process the input information, and/or transmitting input information or recognition output to the remote server via a communication link, and causing the server to send the output information to the end user via the communication link.

A person or a group of persons first gathers information related to a person or an animal to be memorialized. When in digital format, this information is the output information. The output information is, in some embodiments, gathered prior to the death of a deceased person to be memorialized, in some cases even with the help of the person to be memorialized. If the gathered information is not in electronic form, it is digitized (converted to electronic form). The digitization of the output information is accomplished either by the gatherer of the information, such as an end user, or by a service provider such as a memorial business, or by a third party service provider such as an ancestry service, an historian, or a combination of two or more end users, service providers, or third party service providers. The techniques employed to digitize information are not particularly limited and include any of those techniques known to those of skill, such as digital scanning of written materials or images, and digitization of analog audio or video information.

The digitized output information is entered, grouped, and organized within a database. In some embodiments the digitized output information is suitably displayed by one or more devices via an internet connection. In embodiments the display is a web page dedicated to the memorialization of the person, a FACEBOOK® page dedicated to the person to be memorialized, or some other means of display. In some embodiments the display is formatted attractively. In some such embodiments the formatting includes graphic user interfaces such as point-and-click buttons and the like to access different parts of the output information, pull-down menus for access to different parts of the output information, features such as timelines of events in the memorialized person's life, links to other pages such as web pages formerly maintained by a deceased person, web pages dedicated to showing the ancestry of a deceased person, web pages dedicated to other family members, and the like. In some embodiments, the display also includes advertisements for memorial businesses, such as the provider end service, a funeral home, monument dealer, cemetery, and the like; or for some other business that is displayed in exchange for reduced fees paid by a customer to maintain the database, the display, and other electronic infrastructure services necessary to operate the image-based memorial information retrieval system.

In some embodiments the digitization, setting up of the database, and maintenance of the database are carried out by a service provider, for example via a paid service. In some embodiments, such services include provision and maintenance of a web site or page, design and formatting of the output information, provision of an interface to the information that permits users, including the client, to access the output information; and secure access to some or all of the output information. In some embodiments the database is set up to provide varying levels of access to the output information; for example, some output information is made available to anyone accessing the database while other information is made available only to those who have a password or other login credentials. In some embodiments, those accessing the database can further add to the database content; this ability too can be limited as to the scope and nature of the content to be added. For example, in some embodiments members of the public who access the database could enter their name and the date they accessed the database, while those having a password could enter additional output information, e.g. new or recently discovered digitized output information relating to the person to be memorialized. In yet other embodiments, any person could submit additional output information and a selected end user, such as the person who pays for, maintains or is responsible for the content of the image-based memorial information retrieval system, a designated person with special access, a paid service provider, or the like can review and approve the additional output information for inclusion in the database.

A database is populated with output information in a record. Once the record contains a partial or complete collection of output information, the record is assigned an identifier. The identifier is a unique identifying value or string that is then associated with sample values from a selected digital image or steganographic data embedded within the image. A customer or an end user then selects a digital image of the memorial information and associates the sample values generated from the image, a portion thereof, or steganographic data embedded therein with the string or identifying value. The image and sample values obtained therefrom are, in some embodiments, housed within a different database from the output information; in other embodiments the image and sample values obtained therefrom, and the output information are located on the same database. A composite of images is, in embodiments, two or more images taken from a variety of perspectives, including different angles, close ups and remote images, images of a single feature of the memorial information, images of a combination of features of the memorial information, pictures taken in different seasons and/or in different weather situations, and pictures taken at different times of the day. Sample values from any one or more images, in sum or a composite thereof, or steganographic data gleaned therefrom, are used as the sample values to which the unique identifying value or string is associated. The sample values or steganographic data is the input information, which when applied to one or more recognition algorithms residing in a database results in the generation of recognition output. The one or more recognition algorithms reside, in various embodiments, in the same or in a different database as the output information or the selected image or images and sample values obtained therefrom. The recognition output, when applied to a set of algorithms intended to facilitate a search, is employed to locate the database associated therewith and the specific record associated with the unique identifying value or string. The search algorithms reside, in various embodiments, on the same or a different database as the output information, or the selected image or images and sample values obtained therefrom, or the one or more recognition algorithms. In each case, where two or more databases are employed in the systems or methods of the invention, there is a communication link between the two or more databases. When the search algorithm finds a match with the specific record associated with the unique identifying value or string, a command is issued to display the output information associated with the unique identifying value or string.

For example, in embodiments, an image of a headstone, grave site, engraved images on a headstone, or a combination of two or more thereof is captured by a digital camera by a funeral home worker, cemetery worker, monument builder, or the like before or after a funeral; the image is employed as the input information. In other embodiments, a manufacturer of ceramic or porcelain portraits for headstones, mausoleums, cenotaphs, or urns captures a digital image of the ceramic or porcelain portrait prior to mounting the portrait on a headstone, mausoleum, cenotaph, or urn by using a digital camera; the digital image thus generated is employed as the input information. In still other embodiments, a manufacturer of ceramic or porcelain portraits for headstones, mausoleums, cenotaphs, or urns generates the portrait from a digital image supplied by a client of the manufacturer; and that digital image is employed as the input information. In still other embodiments, a manufacturer of ceramic or porcelain portraits for headstones, mausoleums, cenotaphs, or urns generates the portrait from an analog image supplied by a client of the manufacturer that is then digitized by the manufacturer, wherein the digital image is employed in making the ceramic or porcelain portrait; and that digital image is also employed as the input information. In still other embodiments, a manufacturer of ceramic or porcelain portraits for headstones, mausoleums, cenotaphs, or urns embeds steganographic data within the digital image supplied by a client of the manufacturer; then the digital image along with the embedded steganographic data is included on the ceramic or porcelain portrait. In such embodiments, the steganographic data, the overall digital image supplied by the client, or a combination of both is the input information.

It is an advantage of the invention that if the memorial is moved, for example if an urn is placed in a different location from its original location, or if a cenotaph is set up in a new remote location from its' original location, or a headstone is moved, that the input information often does not require any change or adjustment, because no geographic location data need be employed as input information. Thus, for example, if a memorial portrait is the memorial information, or steganographic data embedded within the memorial portrait is the memorial information, then the portrait can be moved or copied to other locations and the input information is easily derived therefrom regardless of where the portrait is located, without taking any additional steps to adjust the input information to account for a geographic change. Thus, for example, if the memorial information is an urn, an urn with engravings, or an urn with a memorial portrait, then the input information is easily derived independent of the urn's location. In some such embodiments, the image of the urn, optionally in conjunction with engravings, markings, memorial portraits, etc. can be captured prior to addition of the remains of a deceased person therein and moving of the urn to its designated location, such as into the home of a family member of the deceased or a columbarium or niche.

In some embodiments, an end use application is provided to an end user's device, for example via a communication link, by a service provider. In embodiments, the service provider is a memorial business. Alternatively, the end use application is provided to the end user's device by a service provider in the form of a compact disc, flash drive, or some other storage medium. In some embodiments the end use application is downloadable via a wired or wireless internet connection or a satellite connection. The end use application provides a specific link to a server, via a communications link, when activated by the end user. The purpose of the end use application is to enable a digital image captured by the device to generate recognition output or cause recognition output to be generated remotely, and to direct a search engine to use the recognition output to locate the specified output information within a database. In some embodiments, the end use application allows a digital image, acquired by the device's built-in camera, to be processed and sent via the communication link to a database. In some such embodiments, the database receives the image in a recognizable format, as captured, processed, and delivered by the device via the communication link in conjunction with the end use application, and applies the image data to the one or more recognition algorithms present on the database or a different database. In some such embodiments, the image provided to the database is a lower resolution version of the image captured by the camera; this saves storage space, allows for faster transmission time, and allows for faster processing. In other embodiments, the end use application further includes one or more recognition algorithms, such that activation by the end user followed by capturing of a digital image of the memorial information results in one or more recognition algorithms being applied to the image or a processed version thereof such as a lower resolution version of the image. Alternatively, in some embodiments, the one or more recognition algorithms are located on a database, such that the algorithms are applied to the image or processed version thereof after sending the image to the server via the communication link. In such embodiments, the recognition algorithms result in recognition output, and the recognition output is delivered to a database by the end use application via a communications link, where the recognition output is applied to a search engine located on the database to locate the recognition output. Regardless of whether the one or more recognition algorithms are located on the end user's device or on the server, or even on a separate server from the server containing the database, the application is deployed by an action by the end user; subsequent entry of a digital image of the memorial information into the application algorithm, and application of one or more recognition algorithms to the image results in recognition output. The recognition output identifies the database or a specific record within a database when applied to a search engine.

The recognition algorithms, when applied to the input information, generate the recognition output. The recognition algorithms, together with any necessary integration modules, constitute the recognition engine. Algorithms for steganographic data recognition, optical character recognition, image recognition, and facial recognition are known and are achieved by those having skill in the art by following, for example, the procedures of U.S. Pat. Nos. 7,565,139; 6,122,403; 6,307,949; 6,366,680; 6,421,070; 6,516,079, and others are suitably employed in conjunction with the image-based memorial information retrieval system of the present invention. Similarly, end use applications such as GOOGLE® Goggles and DIGIMARC® watermarking and search services are usefully employed in conjunction with the present invention.

The input information, when applied to the recognition engine, generates recognition output. In embodiments, the recognition engine includes multiple recognition algorithms that are applied to the input information. Each engine returns the recognition results with confidence values, and an integrating module outputs a final list of memorial information identified, which is the recognition output. In some embodiments, the input information is applied to multiple recognition algorithms simultaneously, resulting in a confidence value corresponding to the integrated identification. In other embodiments, the input information is applied to a first recognition algorithm, resulting in a first confidence value; depending on the confidence value, the input information is either applied to a second recognition algorithm, or the output of the algorithm is accepted as the recognition output. Third and fourth recognition algorithms can also be employed in series in this fashion. Additionally, the result of each recognition algorithm is integrated with each previous result in some embodiments, such that the confidence values reflect the integrated confidence value. When the confidence value is high enough, the output of the one or more algorithms, or the integrated output of the one or more algorithms, is accepted as the recognition output.

In embodiments, if a single confidence value generated by a recognition algorithm is at least 80%, for example about 85% to 100%, or 90% to 99% then the output is accepted as recognition output. In embodiments where multiple recognition algorithms are employed, each recognition algorithm output to be integrated with other recognition algorithm output should have a confidence value of at least 70%, for example between about 75% and 100%, or between about 75% and 99%, as a criteria for the output to be integrated with the output of the other one or more recognition algorithms. The integrated output of the one or more algorithms is accepted as the recognition output when the confidence value of the integrated output is at least 80%, for example about 85% to 100%, or 90% to 99%. Where multiple algorithms are employed in serial fashion, that is, one after another as is described above, the output of the one or more algorithms, or the integrated output of the one or more algorithms, is accepted as the recognition output when the confidence value of the integrated output is at least 80%, for example about 85% to 100%, or 90% to 99%, The recognition output is the unique identifier or string associated with the particular record, housed within a particular database. The recognition output is applied to a search engine to locate the appropriate record within a database, wherein the record is associated with the recognition output at a sufficient confidence value as determined by the recognition engine. Then one or more algorithms, located on the server or on the end user's device, direct the output information to be transmitted to the end user's device via the communication link and displayed thereon. In some embodiments, some or all of the output information is downloadable to the end user's device. In some embodiments, the display and/or transfer of the output information onto the end user's device is only viewable, or downloadable, or both upon entry of a username, password, key, or a combination of two or more thereof. In some embodiments, the display is available to any person who has a suitable end use application and who captures and sends an image of the memorial information, or recognition output, to the server via a communications link. In other embodiments, only a portion of the display is available to a person who has a suitable end use application and who captures and sends an image of the memorial information, or recognition output, to the server via a communications link.

In some embodiments, any person who receives the display of some or all of the output information can input their name and/or other information into the database, via the communications link and as facilitated by the end use application, as having viewed (or visited) the display. In such embodiments, one or more algorithms generate a "visitor's list" that is viewable by others as output information. In some such embodiments, a visitor may leave, for example, a comment in memoriam, a photograph of themselves, if and how they are related to the person being memorialized, others that accompanied them to the memorial location, the date they visited the memorial, and the like. In some embodiments, such a visitor is said to "check in" at the memorial location.

Figure 3A:
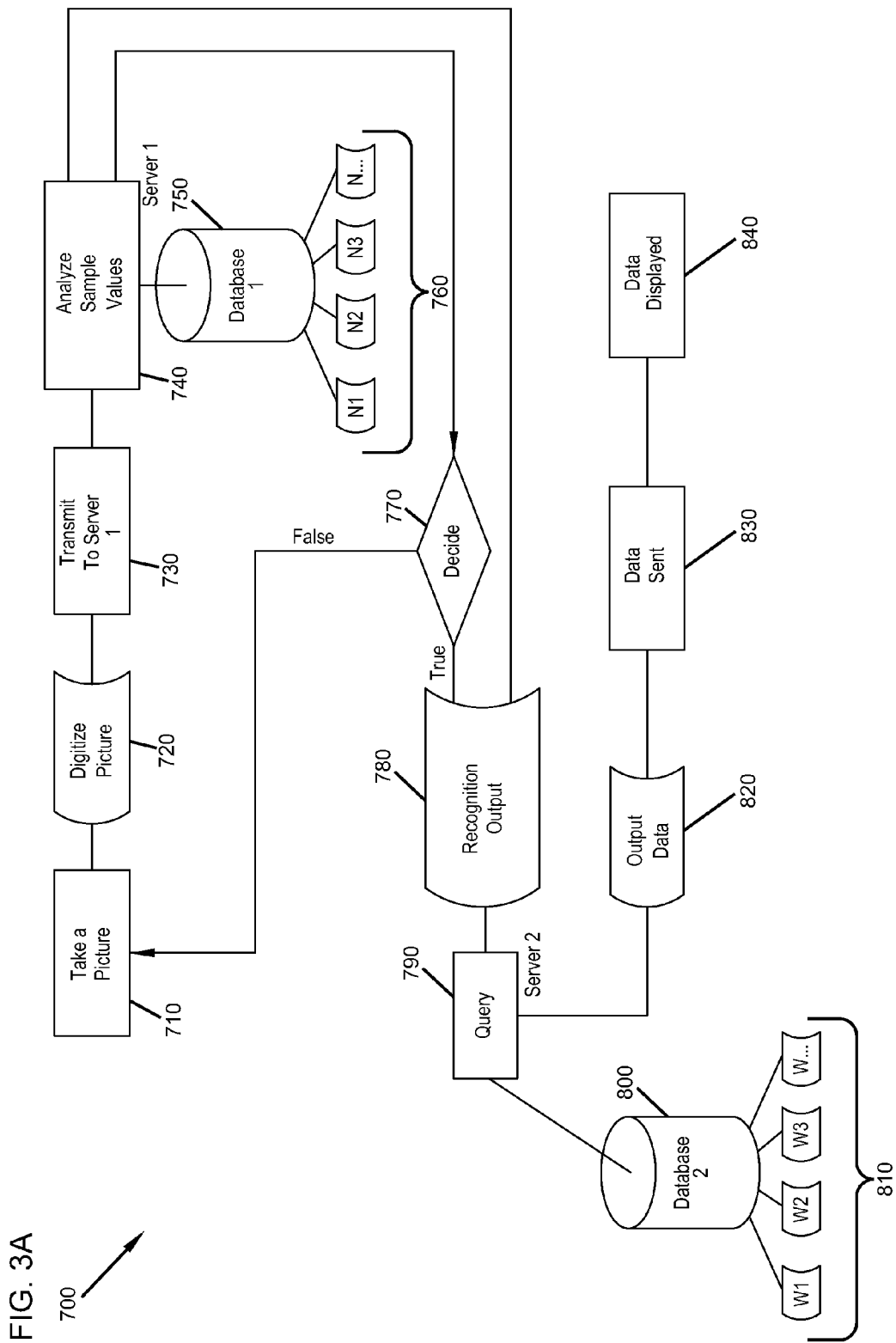
FIG. 3A-3C are flowchart representations of methods of the invention.

FIG. 3A is a flowchart representation of one method 700 of the invention. At the start, an end user uses a device having a digital camera to take a picture 710 of memorial information which is digitized 720 by a processor on the device. The sample values created by digitization 720 are transmitted 730 to a first server. At the server, the sample values are analyzed 740 by applying the sample values to a first database 750 having N1, N2, N3 . . . N records 760, and recognition algorithms. Records 760 include input information. In embodiments, decision 770 is made using criteria of the analysis 740 wherein the decision either results in recognition output 780, or instructions to the end user to re-take the picture 710. In other embodiments, the result of analysis 740 is recognition output 780, thereby bypassing decision 770. Recognition output 780 is then applied to a query 790 on a second server, the server having a second database 800, the database having W1, W2, W3 . . . W records 810 wherein the records 810 include output information. Query 790 results in output data 820 to be retrieved and sent 830 to the end user, typically on the device with which the end user took the picture. The output data is then displayed 840 on the end user's device or on another screen.

Figure 3B:
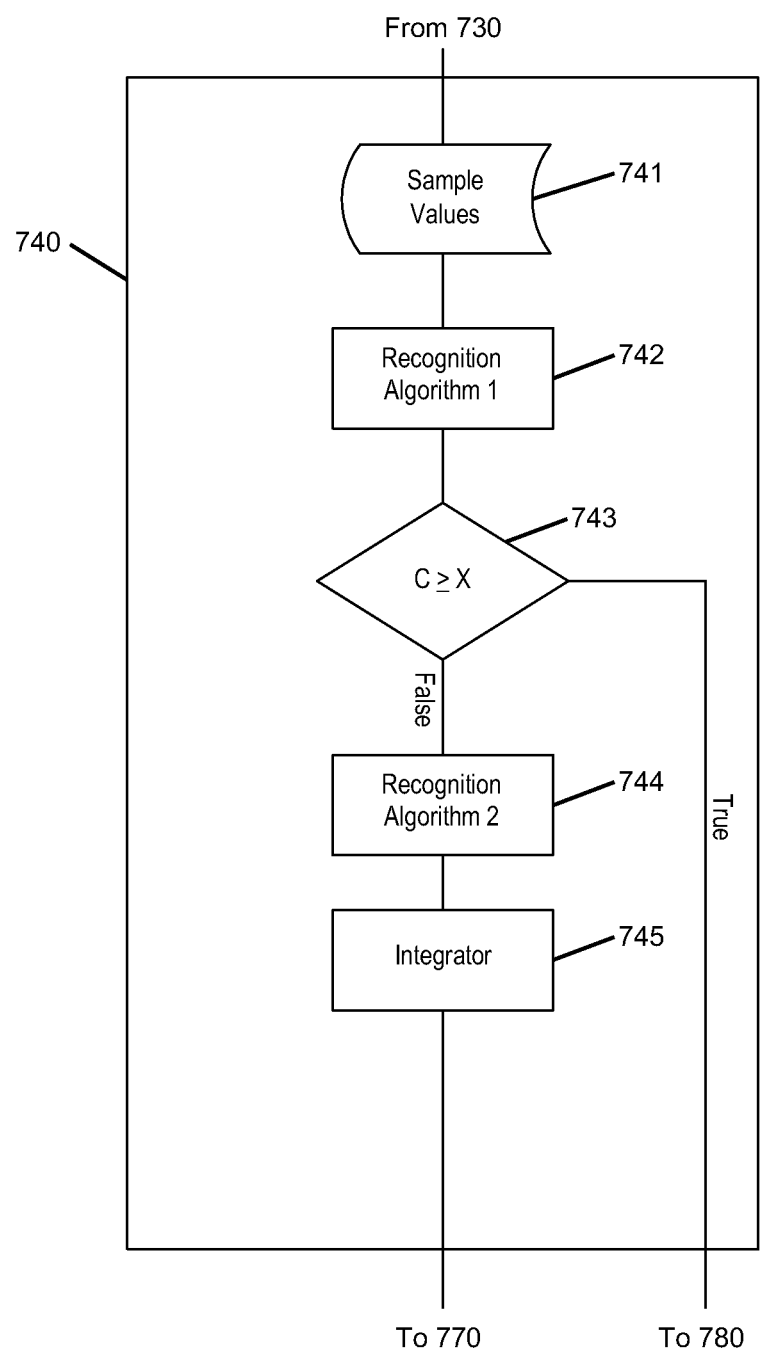
Figure 3C:
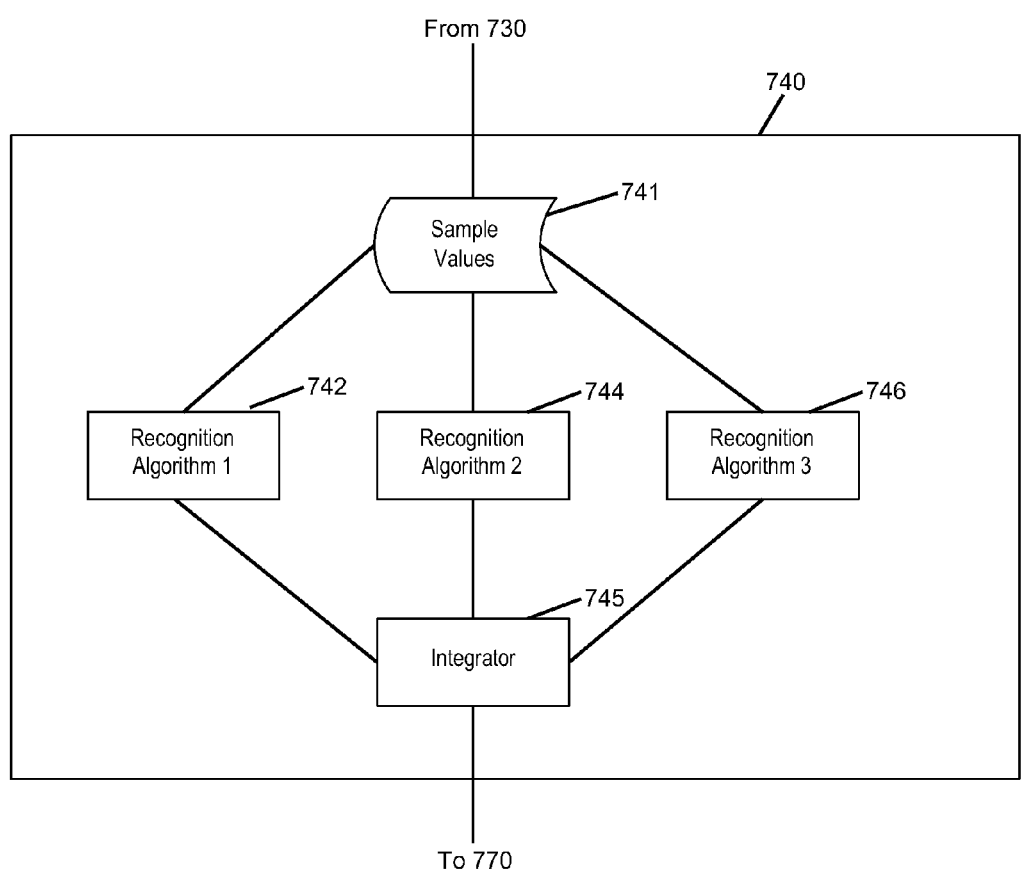

FIGS. 3B and 3C show detailed views of the analysis 740 shown in FIG. 3A. In FIG. 3B, sample values 741 are applied to a first recognition algorithm 742, the outcome of which has a confidence value C. The value of C is then compared 743 to a previously selected value X. If C is greater than or equal to X then no further algorithms are applied and recognition output 780 is generated, bypassing decision 770. If C is less than X, then sample values are applied to a second recognition algorithm 744. The output of the second algorithm is integrated 745 with the output of the first algorithm 742, and decision 770 is made using the confidence value of the integrated output.

In FIG. 3C, sample values 741 are applied simultaneously to first recognition algorithm 742, second recognition algorithm 744, and third recognition algorithm 746, and the confidence values that result from the three algorithms are integrated 745. The integrated confidence value is applied to decision 770.

Other scenarios are encompassed by the methods of the invention; the foregoing is not intended to limit the methods encompassed by the claims but rather to illustrate possible methods of obtaining output information by an end user of the image-based information retrieval system for memorials.

Business Models

To offer the image based search engine in an economic fashion we propose to apply the following business models.

Memorial portraits, such as those sold by Paradise Pictures®, LLC of Chico, Calif., are processed digitally for a specialized printing process, wherein a selected image is entered into a database and a unique identifier is created and attached to the digital image. To create the unique identifier that will serve as the input information, the image is uploaded to a server. In some embodiments, the image or the image resolution is reduced once the image is in the server. In embodiments, image processing is performed in a batch function with software such as ADOBE® PHOTOSHOP® (available from Adobe Systems Incorporated of San Jose, Calif.) or other photo editing software. A script is run that populates the database and returns a report of all images processed for the session. Data captured in the process and held in the database beside the visual identifying information includes, in embodiments, EXIF or another industry standard photographic data format, attached to the digital image file. In embodiments, file data captured from the description area of EXIF includes, but is not limited to, 1. Family name—mapped to Document Title, that is, the title of the specific image digital file
2. Sales order number or quote number—mapped to Author, that is, the person capturing the digital image residing in the database
3. Memorial dealer customer ID—mapped to Author or Document Title When the script runs to populate the database with the digital image, the file data can be stripped out and populated in related (or relational) tables that allow for easy lookup and identification of any image from any data point. In embodiments, this provides ease in linking of a memorial portrait image to a unique record within a database related to the person (output information) and back to business records.

In embodiments, an intermediary customer that is a memorial business sells an online display of output information. In some such embodiments, an employee of the intermediary customer sets up the relationship between a memorial portrait provider and a web site display provider. In other such embodiments, the memorial portrait provider and the web site display provider are the same business entity. A person associated with an intermediary customer accesses the database holding the output information, for example a dashboard or a control panel, to create a unique record within the database and to transfer unique identifying information to the database for retrieving information. The image-based system for retrieving information is then directed to a unique URL with the associated web site containing output information. A login and password to the unique web site is created and issued to a customer—who in some embodiments is the end user; in other embodiments is the intermediary customer; in still other embodiments is a different intermediary customer—for purposes of gaining access to populate the various fields within a record with specific output information related to the person or to change or edit the data within the fields.

In another embodiment, where an image of a memorial portrait, for example in a cemetery, is captured by a mobile device and the input information associated with the image is not in a database, an offer to link the input information to a web site that allows for more detailed info about the deceased person is made on the spot. For example, when a photograph is taken of a memorial portrait and no link is found in the database, an end use type application on the mobile device makes an offer to create a unique web site related to the photograph taken. A check out page is presented and the individual can pay for the web site on the spot with a promise of in a certain time to receive an e-mail with login instructions for the web site so the individual may populate the site with data. If the offer is accepted, a specific record is created in a database that allows a customer to populate various fields within the unique record with data of what will ultimately be returned as content within a web site (output information). At the time of offer acceptance the original digital image taken by the individual is uploaded to the database and all related unique identifiers are created automatically by a server script. The unique identifier attached to the photographic image is then linked to the unique web site created for the end user or end users.

In yet another embodiment, an existing customer of memorial portraits wants to sell after-the-fact online memorialization linked to the image-based system for retrieving information. In this case the customer contacts the memorial portrait manufacturer to locate the original archival image from which a memorial portrait was produced. That image would be moved into the memorial information database, if not already there, and all the unique identifiers are set up by the system and the unique record, within a database, relating to a person is created for the customer to populate associated fields as they wish.

In still another embodiment, a memorial portrait manufacturer submits digital images for inclusion in the database for which it may be recognized by the image-based system for retrieving information. In embodiments, upon recognition of the input information the system forwards to a currently offered online product or to a URL of the customer's specification.

In still another embodiment, further in conjunction with any of the embodiments of the business methods described, a branded product is provided to a cemetery as a paid service and promoted by them which may include a unique branded smartphone end use application or applications related to their cemetery and a unique table in a database containing memorial information typically only found on their property or within their control. The end use application built for a mobile device platform, for example a smartphone running a particular operating system, is branded with logos and information relating to one or more of these memorial businesses. A business model is to license the end use application to an end user; and license the recognition system pointing to a unique table within the database that houses the output information to the cemetery. The recognition system is maintained by any of a number of providers. When people access a cemetery property, they can be made aware, for example by cemetery personnel or by signage on the cemetery property, that the end use application is available for immediate download to recognize memorial portraits on monuments, cenotaphs, mausoleums, columbariums or other memorialization platforms. The download is promoted through a sign, plaque, or handout that may include a bar code, such as a 2D or Quick Response (QR) bar code with an embedded link to provide an immediate download of the app to a phone or other device. The search service is offered such that a distributed server network is provided to which images can be sent. The output information is sent back to the querying client database. The output information is then provided to the end user via the end use application.

In embodiments, other offerings are included in the application, such as lots available for sale, vase or urn sale or replacement options, memorial flower placements, lot gardening services, and the like. In some embodiments, the cemetery issues tablet computers or other mobile devices with on-board digital camera and cellular or wireless data access for cemetery visitors to use on their walk through of the property, wherein the mobile devices are pre-loaded with the end user application. In embodiments, the mobile devices are dedicated solely to the employment of the end use application. In embodiments, the version of the end use application on the device issued by the cemetery includes a function whereby a link to the output information in the database is sent, such as by email, to the borrower's home computer or other means whereby the borrower can access the output information after returning the borrowed device and leaving the cemetery grounds.

In some embodiments, the end use application is free and available for download and provides a means to activate one or more recognition engines and search engines when the digital camera on the end user's device is employed in conjunction with the free application to capture a digital image of the memorial information. The database housing the output information is accessed by the one or more search engines activated by the free application to locate and retrieve the output information and cause the information to be displayed on the user's device.

In embodiments, a fixed monthly, yearly, or other periodic fee is charged for the service of setting up and maintaining the database. In other embodiments, a fee per entry into the database is charged. In still other embodiments, a single fee is charged for the lifetime of the services. In embodiments, the customer of the search service can choose open access, password access, provide names of those allowed to access, or be contacted for permission each time in order to provide access to the database. In embodiments, the query to the database could also feed the information to a third party search engine such as an historical search engine or an ancestry search engine.

In embodiments, the end user application is provided through a third party online "store" known to sell applications for various end uses, such as games, music, and the like. In such embodiments, the end user would have to take voluntary action to procure the end use application. In other embodiments, the end use application is sent via a text message, an email, or some other means of direct and personal communication to an individual's personal mobile device.

The present invention may suitably comprise, consist of, or consist essentially of, any of the disclosed or recited elements. The invention illustratively disclosed herein can be suitably practiced in the absence of any element which is not specifically disclosed herein. The various embodiments described above are provided by way of illustration only and should not be construed to limit the claims attached hereto. It will be recognized that various modifications and changes may be made without following the example embodiments and applications illustrated and described herein, and without departing from the true spirit and scope of the following claims.

We claim:

1. A method of obtaining information about a deceased person or animal, the method comprising
   a. obtaining input information from a mobile device, the mobile device comprising a digital camera, wherein the input information comprises sample values obtained from a digital camera image of the memorial information, the memorial information characterized by the absence of a visible identifier indicating the availability of output information,
   b. providing the input information to a first database via a communication link, the database located on a server,
   c. analyzing the input information to generate a recognition output;
   d. applying the recognition output as a query to a second database to generate the output information, the second database located on the same server or a different server;
   e. receiving the output information on the mobile device from the second database via the communication link, wherein the output information is associated with a deceased person or animal; and
   f. displaying the output information on the mobile device.

2. The method of claim 1 wherein the memorial information is located on a memorial or proximal to a memorial.

3. The method of claim 1 wherein the memorial information comprises an image of a gravesite, a tombstone, an urn, a mausoleum, a section of a mausoleum, a columbarium, a section of a columbarium, a niche or a cenotaph.

4. The method of claim 3 wherein the image comprises engraved indicia or engraved images.

5. The method of claim 1 wherein the memorial information is unique to a person being memorialized.

6. The method of claim 1 wherein the server, the mobile device, or both further comprise one or more recognition algorithms, one or more of the algorithms are applied to the input information to generate recognition output, and the recognition output is associated with the output information in the database by a search engine.

7. The method of claim 6 wherein the one or more recognition algorithms comprise code recognition algorithms, optical character recognition algorithms, image recognition algorithms, facial recognition algorithms, or a combination thereof.

8. The method of claim 1 wherein the mobile device is a smartphone.

9. The method of claim 1 wherein the obtaining, providing, receiving, and displaying are carried out using the mobile device.

10. The method of claim 1 wherein one or more of the obtaining, providing, receiving, and displaying are accomplished by executing an end use application on the mobile device.

11. The method of claim 1 wherein the database comprises output information for a plurality of deceased persons.

12. The method of claim 1 wherein the input information is derived from sample values representing memorial information related to one deceased person or a group of deceased persons that is a subset of the plurality of deceased persons.

13. The method of claim 1 wherein the output information comprises one or more photographic images, videos, written testimonials, biographical data, data links to websites, advertising information, or a combination of one or more thereof.

14. A system for retrieving information about a deceased person or animal, the system comprising
   a. memorial information unique to the deceased person or animal, the memorial information characterized by the absence of a visible identifier indicating the availability of output information;
   b. a first database located on a server, the first database configured to receive the memorial information and generate recognition output;
   c. a second database located on the same or a different server, the second database configured to receive the recognition output and generate output information related to a deceased person or animal; and
   d. a mobile device comprising a digital camera, an operable communications link with the server, and a screen for displaying the output information,
wherein the mobile device, a server, or both comprise one or more recognition algorithms.

15. The system of claim 14, further comprising an end use application operably engaged by a user of the mobile device, wherein the application establishes the operable communications link.

16. The system of claim 14 wherein the one or more recognition algorithms comprise one or more steganographic recognition algorithms, optical character recognition algorithms, image recognition algorithms, facial recognition algorithms, or integration algorithms.

17. The system of claim 14 wherein the memorial information is located on or proximal to a memorial.

18. The system of claim 17 wherein the memorial is a gravesite, a tombstone, an urn, a mausoleum, a section of a mausoleum, a columbarium, a section of a columbarium, a niche or a cenotaph.

19. The system of claim 18 wherein the memorial information comprises an image of a gravesite, a tombstone, an urn, a mausoleum, a section of a mausoleum, a columbarium, a section of a columbarium, a niche or a cenotaph.

20. The system of claim 19 wherein the image comprises engraved indicia or engraved images.

21. A method of obtaining information about a deceased person or animal, the method comprising provider actions and end user actions;
   wherein the provider actions comprise:
      a. obtaining a digital image of the memorial information,
      b. generating input information by
         i. recording sample values representing the digital image; and
         ii. associating the sample values with a selected set of output information in a database, the database residing on a server, wherein the output information is associated with a deceased person or animal; and
      c. providing an end-use application to a mobile device, the end-use application operably engaged by the end user to at least establish a communication link with the server;
   and wherein the end-user actions comprise:
      d. obtaining input information from the mobile device, the mobile device comprising a digital camera, wherein the input information comprises sample values obtained from a digital camera image of the memorial information, the memorial information characterized by the absence of a visible identifier indicating the availability of output information,
      e. providing the input information to a first database via a communication link, the database located on a server,
      f. analyzing the input information to generate a recognition output;
      g. applying the recognition output as a query to a second database to generate the output information, the second database located on the same server or a different server;
      h. receiving the output information on the mobile device from the database via the communication link; and
      i. displaying the output information on the mobile device.

* * * * *